(12) United States Patent
Egashira et al.

(10) Patent No.: US 8,802,778 B2
(45) Date of Patent: Aug. 12, 2014

(54) GOLF BALL MATERIAL, GOLF BALL AND METHOD FOR PREPARING GOLF BALL MATERIAL

(75) Inventors: Yoshinori Egashira, Chichibu (JP); Jun Shindo, Chichibu (JP); Eiji Takehana, Chichibu (JP)

(73) Assignee: Bridgestone Sports Co., Ltd., Tokyo (JP)

( * ) Notice: Subject to any disclaimer, the term of this patent is extended or adjusted under 35 U.S.C. 154(b) by 507 days.

(21) Appl. No.: 12/061,740

(22) Filed: Apr. 3, 2008

(65) Prior Publication Data
US 2009/0253534 A1 Oct. 8, 2009

(51) Int. Cl.
*C08L 33/02* (2006.01)
*C08L 77/06* (2006.01)
*C08L 77/00* (2006.01)
*A63B 37/00* (2006.01)
*A63B 37/12* (2006.01)

(52) U.S. Cl.
USPC ........... 525/179; 525/183; 473/373; 473/378; 473/385

(58) Field of Classification Search
None
See application file for complete search history.

(56) References Cited

U.S. PATENT DOCUMENTS

| | | | |
|---|---|---|---|
| 4,992,515 A | 2/1991 | Ballard | |
| 5,739,262 A | 4/1998 | Morhenn et al. | |
| 5,866,658 A * | 2/1999 | Talkowski | 525/183 |
| 6,353,058 B1 | 3/2002 | Rajagopalan | |
| 6,380,349 B1 | 4/2002 | Rajagopalan | |
| 6,486,250 B1 | 11/2002 | Rajagopalan | |
| 6,774,184 B2 | 8/2004 | Rajagopalan | |
| 6,800,690 B2 * | 10/2004 | Rajagopalan et al. | 525/183 |
| 2002/0013413 A1 * | 1/2002 | Bellinger et al. | 525/179 |
| 2003/0224874 A1 * | 12/2003 | Takesue et al. | 473/371 |
| 2004/0044136 A1 | 3/2004 | Kim | |
| 2005/0014874 A1 * | 1/2005 | Hoerold et al. | 524/126 |
| 2006/0030668 A1 * | 2/2006 | Egashira et al. | 525/221 |

FOREIGN PATENT DOCUMENTS

| | | | |
|---|---|---|---|
| GB | 1368054 | * | 9/1974 |
| JP | 1-171455 A | | 7/1989 |
| JP | 3-106646 A | | 5/1991 |
| JP | 8-225644 A | | 9/1996 |
| JP | 2000-186152 A | | 7/2000 |
| JP | 2001-514561 A | | 9/2001 |
| JP | 2006-111763 A | | 4/2006 |
| JP | 2007-029668 A | | 2/2007 |

OTHER PUBLICATIONS

Fakirov; Handbook of Condensation Thermoplastic Elastomers; 2005; pp. 243-245.*
Machine translation of JP2000186152; no date.*

* cited by examiner

Primary Examiner — David Buttner
(74) Attorney, Agent, or Firm — Sughrue Mion, PLLC

(57) ABSTRACT

The invention provides golf ball materials which include, in admixture, (A) an oxygen-containing inorganic metal compound, (B) one or more polymers selected from the group consisting of multi-component polyamides, and (C) an acid-containing polymer, and additionally includes, if the oxygen-containing inorganic metal compound (A) does not include a zinc cationic species, (D) a zinc ionomer. The invention also provides methods for preparing such golf ball materials, and golf balls made with the materials. The golf ball materials are multi-component polyamide blend compositions having an excellent flow and processability and a suitable hardness, making them ideal as materials for obtaining high-performance golf balls which are endowed with outstanding durability and scuff resistance without any loss in rebound resilience.

23 Claims, No Drawings

GOLF BALL MATERIAL, GOLF BALL AND METHOD FOR PREPARING GOLF BALL MATERIAL

BACKGROUND OF THE INVENTION

The present invention relates to a golf ball material which has an excellent thermal stability, processability and flow, enabling high-performance golf balls endowed with a good durability and scuff resistance to be obtained therefrom. The invention also relates to a golf ball that includes as an essential component a molding made from such a golf ball material, and to a method for preparing such a golf ball material.

In recent years, ionomer resins have been widely used as cover materials for golf balls. Ionomer resins are ionic copolymers composed of an olefin such as ethylene and an unsaturated carboxylic acid such as acrylic acid, methacrylic acid or maleic acid, in which some of the acid groups are neutralized with metal ions such as sodium, lithium, zinc or magnesium. These resins provide excellent characteristics in terms of ball durability, rebound resilience and scuff resistance.

Today, the base resins used in golf ball cover materials are predominantly ionomer resins, but a variety of modifications are being made to cope with the constant desire of the users for golf balls which have an excellent thermal stability, durability and scuff resistance.

For example, to improve the heat resistance and scuff resistance of ionomer cover materials, cover materials obtained by blending an ionomer resin with a polyamide having a heat resistance and a high hardness have been described (e.g., Patent Document 1: U.S. Pat. No. 6,353,058; Patent Document 2: U.S. Pat. No. 6,380,349; Patent Document 3: U.S. Pat. No. 6,486,250; Patent Document 4: U.S. Pat. No. 6,774,184; and Patent Document 5: U.S. Pat. No. 6,800,690.

However, in these prior-art publications, as the amount of the polyamide constituent increases, and particularly as the polyamide constituent becomes the matrix, it is inevitably necessary to set the injection molding temperature higher. As a result, thermal deterioration of the ionomer, which has a poor heat resistance, is readily induced, which tends to dramatically lower the physical properties of the molded parts.

Ternary polyamide materials having a good flowability with a low melting point have recently been disclosed for the purpose of improving processability (e.g., Patent Document 6: U.S. Pat. No. 4,992,515; Patent Document 7: JP-A 3-106646; Patent Document 8: JP-A 8-225644; Patent Document 9: JP-A 11-71455; and Patent Document 10: JP-A 2006-111763.

However, when materials prepared by melt-blending such ternary polyamides and ionomers are used in golf balls, the balls tend to have a very poor durability, which is a defect attributable to the polyamide blend material.

| Patent Document 1: | U.S. Pat No. 6,353,058 |
|---|---|
| Patent Document 2: | U.S. Pat No. 6,380,349 |
| Patent Document 3: | U.S. Pat No. 6,486,250 |
| Patent Document 4: | U.S. Pat No. 6,774,184 |
| Patent Document 5: | U.S. Pat No. 6,800,690 |
| Patent Document 6: | U.S. Pat No. 4,992,515 |
| Patent Document 7: | JP-A 3-106646 |
| Patent Document 8: | JP-A 8-225644 |
| Patent Document 9: | JP-A 11-71455 |
| Patent Document 10: | JP-A 2006-111763 |

SUMMARY OF THE INVENTION

It is therefore an object of the invention to provide a golf ball material obtained from using a polymer blend composition of a ternary polyamide-containing polyamide material and an acid-containing polymer material. The golf ball material, of which the golf ball composed overcomes the poor durability that is characteristic of polyamide-containing materials, has an excellent thermal stability, flow and processability, and possesses a suitable hardness, thus enabling the golf ball obtained therefrom to get high-performances such as a good durability and scuff resistance. Another object of the invention is to provide a golf ball which includes as an essential component a molding made from such a golf ball material. A further object of the invention is to provide a method for preparing such a golf ball material.

As a result of extensive investigations, the inventors have found out that when an oxygen-containing inorganic metal oxide (A) is mixed with an acid-containing polymer blend composition of (B) one or more polymers selected from the group consisting of multi-component polyamides and (C) one or more acid-containing polymers selected from the group consisting of olefin-unsaturated carboxylic acid copolymers, olefin-unsaturated carboxylic acid-unsaturated carboxylic acid ester terpolymers, unsaturated carboxylic anhydride-containing polymers, unsaturated dicarboxylic acid-containing polymers and unsaturated dicarboxylic acid half ester-containing polymers, the neutralization reaction by component (A) on the acids in the acid-containing polymer blend composition proceeds smoothly, resulting in the formation of a uniform material.

The inventors have also found out that when an oxygen-containing inorganic metal oxide which does not contain a zinc cationic species (A3, A4) is used as component A, if this component A is mixed with an acid-containing polymer blend composition of (B), (C) and (D) that is obtained by using (B) one or more polymers selected from the group consisting of multi-component polyamides, and blending therewith both a thermoplastic polymer containing as an ingredient (D) an ionomer which includes at least a zinc cationic species and above-described component (C), the neutralization reaction by (A) on the acids in the acid-containing polymer blend composition proceeds smoothly, resulting in the formation of a uniform material.

Moreover, the above-described golf ball materials were found to have an excellent thermal stability, flow and processability, to have a suitable hardness and to be suitable for injection molding, making them ideal materials for the production of high-performance golf balls endowed with a good durability and scuff resistance.

On conducting further investigations, the inventors have additionally found out that golf balls which include, as an essential golf ball component, a molding made from the above-described golf ball material (e.g., the cover material in a solid two-piece golf ball composed of a core and a cover encasing the core, or the cover material or intermediate layer material in a solid multi-piece golf ball composed of a core of one or more layers, an intermediate layer of one or more layers encasing the core, and a cover of one or more layers encasing the intermediate layer) have an excellent durability and scuff resistance.

Accordingly, the invention provides the following golf ball materials, golf balls, and methods for preparing golf ball materials.

[I] A golf ball material composed of, in admixture:
(A) an oxygen-containing inorganic metal compound;

(B) one or more polymers selected from the group consisting of multi-component polyamides; and
(C) one or more acid-containing polymers selected from the group consisting of olefin-unsaturated carboxylic acid copolymers, olefin-unsaturated carboxylic acid-unsaturated carboxylic acid ester terpolymers, unsaturated carboxylic anhydride-containing polymers, unsaturated dicarboxylic acid-containing polymers and unsaturated dicarboxylic acid half ester-containing polymers, and having an acid content of from 0.5 to 30 wt %.

[II] A golf ball material composed of, in admixture:
(A) ultrafine particles of an oxygen-containing inorganic metal compound which does not include a zinc cationic species (A3) and/or an oxygen-containing inorganic metal compound in masterbatched form which does not include a zinc cationic species (A4);
(B) one or more polymers selected from the group consisting of multi-component polyamides;
(C) one or more acid-containing polymers selected from the group consisting of olefin-unsaturated carboxylic acid copolymers, olefin-unsaturated carboxylic acid-unsaturated carboxylic acid ester terpolymers, unsaturated carboxylic anhydride-containing polymers, unsaturated dicarboxylic acid-containing polymers and unsaturated dicarboxylic acid half ester-containing polymers, and having an acid content of from 0.5 to 30 wt %; and
(D) an ionomer which includes at least a zinc cationic species.

[III] A method for preparing a golf ball material which is composed of, in admixture:
(A) an oxygen-containing inorganic metal compound;
(B) one or more polymers selected from the group consisting of multi-component polyamides; and
(C) one or more acid-containing polymers selected from the group consisting of olefin-unsaturated carboxylic acid copolymers, olefin-unsaturated carboxylic acid-unsaturated carboxylic acid ester terpolymers, unsaturated carboxylic anhydride-containing polymers, unsaturated dicarboxylic acid-containing polymers and unsaturated dicarboxylic acid half ester-containing polymers, and having an acid content of from 0.5 to 30 wt %,
the method being composed of blending together components B and C to form an acid-containing polymer blend composition, then mixing component A into the acid-containing polymer blend composition so as to carry out a reaction which neutralizes the acids in the acid-containing polymer blend composition.

[IV] A method for preparing a golf ball material which is composed of, in admixture:
(A) ultrafine particles of an oxygen-containing inorganic metal compound which does not include a zinc cationic species (A3) and/or an oxygen-containing inorganic metal compound in masterbatched form which does not include a zinc cationic species (A4);
(B) one or more polymers selected from the group consisting of multi-component polyamides;
(C) one or more acid-containing polymers selected from the group consisting of olefin-unsaturated carboxylic acid copolymers, olefin-unsaturated carboxylic acid-unsaturated carboxylic acid ester terpolymers, unsaturated carboxylic anhydride-containing polymers, unsaturated dicarboxylic acid-containing polymers and unsaturated dicarboxylic acid half ester-containing polymers and having an acid content of from 0.5 to 30 wt %; and
(D) an ionomer which includes at least a zinc cationic species,
the method being composed of blending together components B, C and D to form an acid-containing polymer blend composition, then mixing (A3) ultrafine particles of an oxygen-containing inorganic metal compound which does not include a zinc cationic species and/or (A4) an oxygen-containing inorganic metal compound in masterbatched form which does not include a zinc cationic species into the acid-containing polymer blend composition so as to carry out a reaction which neutralizes the acids in the acid-containing polymer blend composition.

[V] A golf ball which includes a part molded from the aforementioned golf ball material, and preferably a golf ball wherein the golf ball material is used as a cover material in a solid two-piece golf ball having a core and a cover encasing the core or as a cover material or an intermediate layer material in a solid multi-piece golf ball having a core of at least one layer, at least one intermediate layer encasing the core, and a cover of at least one layer encasing the intermediate layer.

DETAILED DESCRIPTION OF THE INVENTION

The invention is described more fully below.
The golf ball material according to a first aspect of the invention is characterized by being composed of, in admixture:
(A) an oxygen-containing inorganic metal compound;
(B) one or more polymers selected from the group consisting of multi-component polyamides; and
(C) one or more acid-containing polymer selected from the group consisting of olefin-unsaturated carboxylic acid copolymers, olefin-unsaturated carboxylic acid-unsaturated carboxylic acid ester terpolymers, unsaturated carboxylic anhydride-containing polymers, unsaturated dicarboxylic acid-containing polymers and unsaturated dicarboxylic acid half ester-containing polymers, and having an acid content of from 0.5 to 30 wt %.

Component (A) is preferably selected from (A1) ultrafine particles of an oxygen-containing inorganic metal compound which includes at least a zinc cationic species and/or (A2) an oxygen-containing inorganic metal compound in masterbatched form which includes at least a zinc cationic species.

The golf ball material according to a second aspect of the invention is characterized by being composed of, in admixture:
(A) ultrafine particles of an oxygen-containing inorganic metal compound which does not include a zinc cationic species (A3) and/or an oxygen-containing inorganic metal compound in masterbatched form which does not include a zinc cationic species (A4);
(B) one or more polymers selected from the group consisting of multi-component polyamides;
(C) one or more acid-containing polymers selected from the group consisting of olefin-unsaturated carboxylic acid copolymers, olefin-unsaturated carboxylic acid-unsaturated carboxylic acid ester terpolymers, unsaturated carboxylic anhydride-containing polymers, unsaturated dicarboxylic acid-containing polymers and unsaturated dicarboxylic acid half ester-containing polymers, and having an acid content of from 0.5 to 30 wt %; and
(D) an ionomer which includes at least a zinc cationic species.

In the present invention, to produce a better golf ball material by having the acid-neutralizing reaction proceed to a target degree of neutralization in a single pass and thus avoid the thermal history associated with a polymer material obtained after a plurality of extruder passes, it is preferable for ultrafine particles of an oxygen-containing inorganic metal compound (A1 or A3) to be selected for use as the oxygen-containing inorganic metal compound (A).

It is desirable for the ultrafine particles (A1 or A3) preferably used in the invention to have an average particle size of from 0.005 to 0.1 μm and a particle size distribution in a range of from 0.001 to 1.0 μm. These particles, compared with conventional particles having several tens of microns in size, have a better surface activity, a higher reactivity with acids and a better dispersibility, all of which is advantageous for the neutralization reaction of the invention.

The oxygen-containing inorganic metal compound (A) is preferably selected from among metal oxides, metal carbonates and metal hydroxides having a low moisture absorption. Moreover, the metal in the oxygen-containing inorganic metal compound (A) is preferably selected from among groups IA, IB, IIA, IIB, IIIA, IIIB, IVA, IVB, VA, VB, VIA, VIB, VIIB and VIIIB of the periodic table. Generally, if the oxygen-containing inorganic metal compound is used without modification to carry out a neutralization reaction on the acids in an acid-containing polymer composition, the unreacted oxygen-containing inorganic compound remains in the form of undispersed masses. In such cases, by making a plurality of passes through the extruder, the acid-neutralizing reaction is brought to completion at the target degree of neutralization. To illustrate, U.S. Published Patent Application No. 2004/0044136 describes an example in which magnesium hydroxide is used as the oxygen-containing inorganic metal compound and the acid-containing polymer is passed several times through a twin-screw extruder to carry out the acid-neutralization.

As with the oxygen-containing inorganic metal compound (A), the above-mentioned oxygen-containing inorganic compound in the form of ultrafine particles (A1) is preferably selected from among metal oxides, metal carbonates and metal hydroxides having a low moisture absorption. Moreover, the metal in the oxygen-containing inorganic metal compound (A) is preferably selected from among groups IA, IB, IIA, IIB, IIIA, IIIB, IVA, IVB, VA, VB, VIA, VIB, VIIB and VIIIB of the periodic table. Examples of the oxygen-containing inorganic compound in the form of ultrafine particles (A1) include, but are not limited to, lithium carbonate, sodium carbonate, potassium carbonate, magnesium carbonate, calcium carbonate, zinc carbonate (including basic zinc carbonate), magnesium oxide, zinc oxide, calcium oxide and magnesium hydroxide. Any one or combination of two or more of these which includes a zinc cationic species can be used. The above-mentioned ultrafine particles of an oxygen-containing inorganic metal compound (A3), aside from the exclusion of only zinc cationic species from the above-described component (A1), are the same as (A1). Using these ultrafine particles of an oxygen-containing inorganic metal compound (A1, A3) in the reaction to neutralize the acids in the acid-containing polymer blend composition provides such advantages as (1) enabling the reaction to take place smoothly (indicating a high neutralization reactivity with respect to the acid groups), and (2) low production equipment corrosivity compared with metal acetates (which release acetic acid following neutralization).

Alternatively, (A2) an oxygen-containing inorganic metal compound in masterbatched form which includes at least a zinc cationic species or (A4) an oxygen-containing inorganic metal compound in masterbatched form which does not include a zinc cationic species can be used as the oxygen-containing inorganic metal compound (A). In such a case, (A2) or (A4) can be used in place of, or in combination with, the above-described ultrafine particles of an oxygen-containing inorganic compound (A1 or A3). The oxygen-containing inorganic metal compound used for masterbatching has an average particle size of preferably from 0.005 to 50 μm and a particle size distribution of preferably from 0.001 to 300 μm. Although these particles need not be as finely ground as the above-described ultrafine particles of the oxygen-containing inorganic metal compound. If the average particle size is too large, the acid-neutralizing reaction does not go to completion. On the other hand, if the average particle size is too small, dispersion during masterbatch preparation becomes poor. As used herein, "average particle size" and "particle size distribution" refer to values obtained by particle size distribution measurement using a laser diffraction technique (laser diffraction/scattering).

By using the masterbatched oxygen-containing inorganic metal compound (A2 or A4) (referred to below simply as "masterbatch A2 or A4"), the oxygen-containing inorganic metal compound can be uniformly dispersed within the acid-containing polymer composition of components B and C during the acid-neutralizing reaction, thus promoting more uniform reaction and in turn contributing to uniformity of the resulting golf ball material. Also, by preferentially masterbatching an organic acid-free oxygen-containing inorganic metal compound which does not release organic acid following the acid-neutralizing reaction, it is possible to promote the reaction and obtain a uniform material.

When component A2 is used as the masterbatch, the oxygen-containing inorganic metal compound which includes at least a zinc cationic species is a metal oxide, metal carbonate or metal hydroxide, and the metal in the oxygen-containing inorganic metal compound is selected from among groups IA, IB, IIA, IIB, IIIA, IIIB, IVA, IVB, VA, VB, VIA, VIB, VIIB and VIIIB of the periodic table. Examples include, but are not limited to, lithium carbonate, sodium carbonate, potassium carbonate, magnesium carbonate, zinc carbonate (including basic zinc carbonate), magnesium hydroxide, magnesium oxide, calcium hydroxide, calcium oxide and zinc oxide, any one or more of which can be used. When component A4 is used as the masterbatch, aside from excluding only the zinc cationic species, the oxygen-containing inorganic metal compounds that can be employed are the same as in component A2.

The concentration of the oxygen-containing inorganic metal compound in the masterbatch is preferably from 10 to 90 wt %, more preferably from 20 to 80 wt %, and even more preferably from 30 to 70 wt %. If the concentration of the oxygen-containing inorganic metal compound in the masterbatch A2 or A4 is too high, the masterbatch has an unacceptably low melt flow rate (MFR) of below 0.1 g/10 min. In such a case, when the masterbatch is mixed with the acid-containing polymer blend composition of above-described components B and C or the acid-containing polymer blend composition of above-described components B, C and D, the oxygen-containing inorganic metal compound within the masterbatch does not disperse well. On the other hand, if the concentration is low, the amount of the masterbatch added becomes larger, as a result of which the high-MFR base polymers (particularly ethylene waxes and low-acid, high-MFR ethylene polymers) used in the masterbatch does substantially lower the physical properties of the golf ball material.

It is desirable for the base polymer material used in the masterbatch A2 or A4 to be one having a high melt flow rate (MFR). Specifically, the base polymer is typically one having a melt flow rate of preferably at least 10 g/10 min, more preferably at least 50 g/10 min, and even more preferably at least 100 g/10 min. Use can also be made of a liquid wax such as a high-MFR ethylene wax, or a low-acid, high-MFR ethylene polymer. Illustrative examples include Polyethylene Wax AC5120 (available from Tomen Plastics Corporation; acrylic acid content, 15 wt %; MFR, >1,000 g/10 min), Nucrel 599 (available from DuPont; methacrylic acid content, 10 wt %; MFR, 450 g/10 min), Nucrel 699 (available from DuPont; methacrylic acid content, 11 wt %; MFR, 100 g/10 min), and Nucrel N0200H (available from DuPont; methacrylic acid content, 2 wt %; MFR, 130 g/10 min).

The inventive methods for preparing golf ball materials are methods in which the acid-neutralizing reaction with the oxygen-containing inorganic metal compound (A) in the acid-containing polymer blend composition of two or more different polymers (components B and C) or three or more different polymers (components B, C and D) is carried out in a single pass. The acid-neutralizing reaction can be carried out in one pass using an extruder, in particular a twin-screw extruder having disposed therein a screw segment with a kneading disc zone.

The amount of the oxygen-containing inorganic metal compound (A) included in the golf ball material of the invention is determined by the target degree of neutralization of the acid groups present in the acid-containing polymer blend composition of components B and C, or of components B, C and D. Too much component A may result in an excessive degree of neutralization, lowering the melt flow rate (MFR) of the golf ball material and thus adversely affecting the processability. On the other hand, too little component A may diminish the physical properties of the golf ball material and result in a poor durability and scuff resistance in golf balls obtained therefrom.

The method for preparing the above-described masterbatch A2 or A4 can involve the use of an apparatus selected from among twin-screw/single-screw extruders (including kneader-extruders) equipped with a kneader such as a pressurizing or compression kneader and a forced feeder, tandem extruders (consisting of a twin-screw extruder for upstream processing and a vacuum-vented extruder for downstream processing), and vacuum-vented twin-screw extruders. It is preferable either to use a twin-screw/single-screw extruder equipped with a kneader and a forced feeder or to use a tandem extruder. Using these extruders, the oxygen-containing inorganic compound and the base polymer can be dry-blended or can be charged by separate feeders to a hopper and mixed, then pelletized so as to obtain a masterbatch having an MFR in a range of from 0.1 to 100 g/min. The mixing temperature of the masterbatch A2 or A4 is adjusted within a range of from 50 to 220° C., and preferably from 80 to 180° C.

The golf ball material of the invention can be obtained by mixing together the respective above-described ingredients using an internal mixer such as a kneading-type twin-screw extruder, a Banbury mixer, a kneader or a Labo Plastomill. The extruder used for preparing the golf ball material is preferably a twin-screw extruder. It is especially preferable to use a twin-screw extruder which (i) has a vent port and a vacuum line connected thereto, (ii) is equipped with a device for the dropwise addition or pressurized injection of a liquid, and (iii) has disposed therein a screw segment with a kneading disc zone.

In the one-pass acid-neutralizing reaction of the invention, above components B and C are melt-mixed to form an acid-containing polymer blend composition of B and C in a molten state, or above components B, C and D are melt-mixed to form an acid-containing polymer blend composition of B, C and D in a molten state. Above component A is then blended into the acid-containing polymer blend composition in a molten state, and a reaction to neutralize at least some of the acid groups present in the acid-containing polymer blend composition is carried out. A liquid can be added (by injection under pressure or dropwise addition) at this time to promote the acid-neutralizing reaction. The liquid in this case is preferably a compound of the formula ROH, where R represents a hydrogen or an alkyl group. The amount of the liquid added, based on the overall resin extrusion rate, is preferably from about 0.1 to about 10 wt %, more preferably from about 0.5 to about 8 wt %, and even more preferably from about 1.0 to about 5.0 wt %.

Here, the heating conditions can be set to, for example, from 100 to 250° C., although melt-mixing is preferably carried out at a temperature which exceeds the melting points of each of above components B, C and D. The mixing method is not subject to any particular limitation. However, for better microdispersion of component B it is preferable to first thoroughly melt-mix components B and C or components B, C and D so as to obtain the more uniform acid-containing polymer blend composition, then to add and incorporate component A. If additives are to be included, the additives can be added and blended into the composition following the incorporation of component A.

In the practice of the invention, the acid-neutralizing reaction is carried out in a single pass on the acid-containing polymer blend composition of components B and C or the acid-containing polymer blend composition of components B, C and D by blending therein (A) the oxygen-containing inorganic metal compound. The acid-neutralizing reaction in the twin-screw extruder used for this purpose is carried out at a setting temperature of preferably from 110 to 260° C., more preferably from 130 to 250° C., and even more preferably from 170 to 240° C. The extrusion rate for a screw diameter D of 32 mm is preferably from 2 to 60 kg/h, more preferably from 3 to 40 kg/h, and even more preferably from 4 to 30 kg/h. Moreover, letting the screw diameter ratio $D_1/D_2$ ($D_1$ being larger than $D_2$) be A, the extrusion rate during scale-up of the twin-screw extruder is proportional to A within a range of preferably from $A^{1.0}$ to $A^{3.0}$, and more preferably within a range of from $A^{1.5}$ to $A^{2.7}$.

It is preferable for the golf ball material of the invention to have a melt flow rate (MFR) within a specific range so as to ensure flow properties that are particularly well-suited to injection molding and to improve processability. Hence, the melt flow rate for blending the multi-component polyamide material is preferably at least 0.1 g/10 min, and more preferably at least 0.5 g/10 min, but preferably not more than 50 g/10 min, and more preferably not more than 30 g/10 min. A melt flow rate which is too high or too low may significantly lower the processability. As used herein, "melt flow rate" refers to a measured value obtained according to JIS-K7210 at a test temperature of 220° C. and under a test load of 21.18 N (2.16 kgf).

The golf ball material of the invention has, in Fourier transform infrared absorption spectroscopic (FT-IR) measurements, an absorption peak assigned to carbonyl stretching vibrations at 1690 to 1710 cm$^{-1}$ and an absorption peak assigned to the carboxylate anion stretching vibrations of a metal carboxylate at 1530 to 1630 cm$^{-1}$, confirming that the acid-neutralizing reaction has taken place and confirming the presence of ionic crosslinkages.

Molded parts obtained using the golf ball material of the invention have a Shore D hardness of preferably at least 50, and more preferably at least 55, but preferably not more than 75, and more preferably not more than 70. If the molded part has too high a Shore D hardness, the "feel" of the ball when hit diminishes significantly. On the other hand, if the Shore D hardness is too low, the rebound of the ball decreases.

Component B in the invention is one or more polymers selected from the group consisting of multi-component polyamides, and includes at least a ternary polyamide.

Examples of at least ternary polyamides include, but are not limited to, polyamide 6/66/12 (here and below, the numbers indicate the number of carbons), polyamide 6/66/69, polyamide 6/66/610, polyamide 6/66/612, polyamide 6/612/12, polyamide 6/66/610/12 and polyamide 6/69/610/12. Specific examples of commercial products include Isocor 637, Isocor 651 and Isocor 653 available from Shakespeare Company, and TERPALEX available from Ube Industries, Ltd.

Component B in the invention can include, together with at least the above-described ternary polyamide, one or more polyamides selected from the group consisting of binary polyamides (copolyamides) and/or homopolyamides other than the ternary polyamide, and/or one or more polymers selected from the group consisting of thermoplastic polymers. If the oxygen-containing inorganic metal compound serving as component A in the invention does not include a zinc cationic species (i.e., if component A is (A3) or (A4)), together with the use of the above-described one or more polymers selected from the group consisting of multi-component polyamides (component B), a thermoplastic polymer which includes at least a zinc cationic species (component D) is included.

In component B used in the invention, the binary polyamide (copolyamide) and/or homopolyamide which are blended with at least the ternary polyamide are exemplified by, but not limited to, polyamide 6/66, polyamide 6/69, polyamide 6, polyamide 12, polyamide 66, polyamide 69, polyamide 610 and polyamide 612. Specific examples of commercial copolyamides include Isocor CU145SI and Isocor 4011 available from Shakespeare Company, and UBE Nylon 5013B and UBE Nylon 5023 B available from Ube Industries, Ltd. Examples of commercial homopolyamides include UBE Nylon 1013B and UBE Nylon 3014B available from Ube Industries, Ltd., Zytel 101 and Zytel 158 available from DuPont, and Amiran CM2001 available from Toray Industries, Inc.

Examples of the thermoplastic polymers include polyolefin elastomers (including ionomers and metallocene catalyst polyolefins), polystyrene elastomers, polyacrylate polymers, polyamide elastomers, polyurethane elastomers, polyester elastomers, polyacetals and ABS resins. In selecting these thermoplastic polymers, attention must be paid to the compatibility with the product obtained by neutralizing the above-described acid-containing polymer blend composition of components B and C or acid-containing polymer blend composition of components B, C and D, i.e., the compatibility with the golf ball material of the invention. When a non-compatible thermoplastic polymer is selected, the durability of golf balls obtained using the golf ball material is considerably diminished.

Cases in which the oxygen-containing inorganic metal compound (A) in the invention includes no zinc cationic species are described below. That is, when component A is (A3) ultrafine particles of an oxygen-containing inorganic metal compound which does not include a zinc cationic species and/or (A4) an oxygen-containing inorganic metal compound in masterbatched form which does not include a zinc cationic species, along with using the above-described (B) one or more polymers selected from the group consisting of multi-component polyamides, there is also included (D) a thermoplastic polymer composed of an ionomer which includes at least a zinc cationic species. The zinc cationic species-containing ionomer, while not subject to any particular limitation, is a zinc ionomer in which the acid groups on one or more types of the polymers selected from the group consisting of olefin-unsaturated carboxylic acid copolymers, olefin-unsaturated carboxylic acid-unsaturated carboxylic acid ester terpolymers, unsaturated carboxylic acid anhydride-containing polymers, unsaturated dicarboxylic acid-containing polymers and unsaturated dicarboxylic acid half ester-containing polymers are partially neutralized. Specific examples include Surlyn 9150, Surlyn 9320, Surlyn 9910 and Surlyn 9945 available from DuPont, and Iotek 4200, Iotek 7010 and Iotek 7510 available from ExxonMobil Chemical.

In the present invention, the melting point of the ternary polyamide in component (B) is preferably in a range of from about 80° C. to about 250° C., more preferably in a range of from about 90° C. to about 240° C., and even more preferably in a range of from about 100° C. to about 230° C. If the melting point is too low, problems arise in mixture with component (C) or mixture with components (C) and (D). On the other hand, a melting point that is too high causes component (C) or components (C) and (D) to deteriorate, lowering the physical properties of the final product.

It is desirable to set the content of above-described component B in the acid-containing polymer blend composition of components B and C or of components B, C and D to from about 1 to about 50 wt %. The content of ternary polyamide in component B is generally at least about 20 wt %, preferably at least about 30 wt %, more preferably at least about 50 wt %, and up to 100 wt %.

Component C in the inventive golf ball material is one or more acid-containing polymers selected from the group consisting of olefin-unsaturated carboxylic acid copolymers, olefin-unsaturated carboxylic acid-unsaturated carboxylic acid ester terpolymers, unsaturated carboxylic anhydride-containing polymers, unsaturated dicarboxylic acid-containing polymers and unsaturated dicarboxylic acid half ester-containing polymers. The acid content of the acid-containing polymers is preferably from 0.5 to 30 wt %, and more preferably from 1.0 to 25 wt %.

When component C is an olefin-unsaturated carboxylic acid copolymer, the olefin has preferably at least 2 carbons, but preferably not more than 8 carbons, and more preferably not more than 6 carbons. Illustrative examples of such olefins include ethylene, propylene, butene, pentene, hexene, heptene and octene. Ethylene is especially preferred. Illustrative examples of the unsaturated carboxylic acid include acrylic acid, methacrylic acid, 3,3-dimethylacrylic acid, ethacrylic acid, maleic acid, maleic anhydride and fumaric acid. Acrylic acid and methacrylic acid are especially preferred.

When component C is an olefin-unsaturated carboxylic acid-unsaturated carboxylic acid ester terpolymer, the olefin and the unsaturated carboxylic acid are exemplified by the same olefins and unsaturated carboxylic acids as in the above-described olefin-unsaturated carboxylic acid copolymers. The unsaturated carboxylic acid ester is preferably a lower alkyl ester of the above unsaturated carboxylic acids; illustrative examples include methyl methacrylate, ethyl methacrylate, propyl methacrylate, butyl methacrylate, methyl acrylate, ethyl acrylate, propyl acrylate and butyl acrylate. The use of butyl acrylate (n-butyl acrylate, isobutyl acrylate) is especially preferred.

When component C is selected from among unsaturated carboxylic anhydride-containing polymers, unsaturated dicarboxylic acid-containing polymers and unsaturated dicarboxylic acid half ester-containing polymers, a polymer composed of an olefin and at least one compound selected from among unsaturated carboxylic anhydrides, unsaturated dicarboxylic acids and unsaturated dicarboxylic acid half esters is preferred. Examples of unsaturated carboxylic anhydrides include maleic anhydride and itaconic anhydride, with maleic anhydride being especially preferred. Examples of unsaturated dicarboxylic acids include maleic acid, fumaric acid and itaconic acid. Examples of unsaturated dicarboxylic acid half esters include monoesters of the foregoing dicarboxylic acids, such as monoethyl ester of maleic acid, monomethyl ester of fumaric acid and monoethyl ester of itaconic acid. Monoethyl ester of maleic acid is especially preferred. The olefin is one having preferably at least two carbons, but preferably not more than 8 carbons, and more preferably not more than 6 carbons. Examples of such olefins include ethylene, propylene, butene, pentene, hexene, heptene and octene. Of these, the use of ethylene is especially preferred.

Examples of the above-described component C include, but are not limited to, the following polymers:

(a) olefin polymers to which has been grafted an unsaturated carboxylic anhydride, an unsaturated dicarboxylic acid and/or an unsaturated carboxylic acid;

(b) olefin-unsaturated carboxylic acid polymers to which has been grafted an unsaturated carboxylic anhydride, an unsaturated dicarboxylic acid and/or an unsaturated carboxylic acid;

(c) olefin-unsaturated carboxylic acid ester polymers to which has been grafted an unsaturated carboxylic anhydride, an unsaturated dicarboxylic acid and/or an unsaturated carboxylic acid;

(d) olefin-unsaturated carboxylic acid-unsaturated carboxylic acid ester polymers to which has been grafted an unsaturated carboxylic anhydride, an unsaturated dicarboxylic acid and/or an unsaturated carboxylic acid;

(e) olefin-unsaturated carboxylic anhydride-unsaturated carboxylic acid ester polymers;

(f) olefin-unsaturated dicarboxylic acid-unsaturated carboxylic acid ester polymers; and (g) olefin-unsaturated dicarboxylic acid half ester-unsaturated carboxylic acid ester polymers.

Each of the above materials can be obtained using known methods for copolymerization and grafting. If the acid content in the copolymer is too low, the rebound resilience and strength (tensile strength at break) decreases. If the acid content is too high, the processability decreases.

Examples of commercial products used as component C include olefin-unsaturated carboxylic acid polymers such as Nucrel 960 and Nucrel 2806 (both available from DuPont), and ESCOR 5110 and ESCOR 5200 (both available from Exxon-Mobil Chemical).

Examples of olefin-unsaturated carboxylic acid-unsaturated carboxylic acid ester polymers include Bynel 2002 and Bynel 2014 (both available from DuPont), and ESCOR ATX325 and ESCOR ATX320 (both available from Exxon-Mobil Chemical).

Examples of unsaturated carboxylic anhydride polymers include MODIPER A8100 and MODIPER A8200 (both available from NOF Corporation), and LOTADER 3200, LOTADER 5500 and LOTADER TX8030 (available from ARKEMA).

Examples of commercially products used as the unsaturated carboxylic anhydride-grafted polymers include Polybond 3009 and Polybond 3200 (both available from Uniroyal Chemical), ADOMER NF518 and ADOMER QE800 (both available from Mitsui Chemicals, Inc.), Bynel 2174 and Bynel 4206 (both available from DuPont), and Exxelor VA1801 and Exxelor VA1803 (both available from Exxon-Mobil Chemical).

The golf ball material of the invention can additionally include optional additives as appropriate for the intended use. When the inventive golf ball material is used as a cover material, various additives such as pigments, dispersants, antioxidants, ultraviolet absorbers and light stabilizers can be added to above components A to C or components A to D. When such additives are included, they can be added in an amount of generally at least 0.1 part by weight, and preferably at least 0.5 part by weight, but generally not more than 10 parts by weight, and preferably not more than 4 parts by weight, per 100 parts by weight of above components A to C or components A to D combined.

The golf ball material of the invention has a specific gravity which, while not subject to any particular limitation, is preferably at least 0.9, more preferably at least 0.92, and even more preferably at least 0.94, but is preferably not more than 1.3, more preferably not more than 1.2, and even more preferably not more than 1.1.

The golf ball of the invention includes as an essential ball component a part molded from the above-described golf ball material of the invention. Parts molded from the inventive golf ball material can be used as either a portion of the golf ball or the entire golf ball. Examples include the cover of a thread-wound golf ball in which the cover has a single-layer structure or a multi-layer structure of two or more layers; a one-piece golf ball; the solid core or cover of a two-piece solid golf ball; and the solid core, intermediate layer or cover of a multi-piece solid golf ball such as a three-piece solid golf ball. The inventive golf ball is not subject to any particular limitation, provided it is a golf ball which includes as a ball component therein a part molded from the golf ball material of the invention.

It is particularly advantageous for the golf ball material of the invention to be used as the cover material for a solid two-piece golf ball composed of a core and a cover encasing the core, or as the cover material or intermediate layer material for a solid multi-piece golf ball composed of a core of at least one layer, at least one intermediate layer encasing the core, and a cover of at least one layer encasing the intermediate layer.

As explained above, the inventive golf ball material and method of preparation thereof enable the neutralization reaction on the acids in an acid-containing polymer blend composition to be carried to completion, thus providing the golf ball material with an excellent thermal stability, flow and processability and a suitable hardness, and making it possible for high-performance golf balls endowed with good durability and scuff resistance to be obtained.

EXAMPLES

Examples are provided below by way of illustration and not by way of limitation. The twin-screw extruder for the acid-neutralizing reactions used in the examples had a screw diameter of 32 mm, an overall L/D ratio of 41 and an L/D ratio in the kneading disc zone which was 40% of the overall L/D ratio, and was equipped with a vacuum-venting port and a water-injecting device.

Respective masterbatches of sodium carbonate ($Na_2CO_3$) and zinc oxide (ZnO) mentioned in the examples of the invention were prepared as follows.

Masterbatches were prepared from Nucrel (NO200H; acid content, 2 wt %; MFR, 130 g/10 min) as the base polymer using a 5-liter pressurizing or compression kneader. The kneader was charged with a combined weight of 2.0 kg of the base polymer and ground sodium carbonate (average particle size, 4.0 μm) or zinc oxide ZnO (average particle size, 0.8 μm) in a 50/50 weight ratio, and the respective mixture was carried out for 20 minutes while controlling the mixing temperature within a range of 120 to 130° C. The mixture was discharged as a strand from a 40 mm diameter twin-screw/single-screw extruder, and pelletized with a pelletizer. The resulting sodium carbonate ($Na_2CO_3$) masterbatch (sodium carbonate concentration, 50 wt %) had a melt flow rate of 2.5 g/10 min (measured at 190° C. under a load of 21.18 N=2.16 kgf), and the resulting zinc oxide masterbatch (zinc oxide concentration, 50 wt %) had a melt flow rate of 3.0 g/10 min (measured at 190° C. under a load of 21.18 N=2.16 kgf). These masterbatches are abbreviated below as, respectively, "NaMB" and "ZnMB."

Example 1

A polymer blend composition of components B and C was prepared by blending Polyamide-2 as component B and Polymer-2 and Polymer-3 as component C in the proportions shown in Table 1 with the twin-screw extruder set to 240° C. Next, NaMB and ultrafine particles of zinc oxide (ZnO Powder) as component A were dry-blended in the proportions shown in Table 1 with the polymer blend composition, following which the neutralization reaction was carried out in the twin-screw extruder set to 230° C. while carrying out water injection (2 wt % with respect to the extrusion rate) and vacuum venting. Table 1 shows the physical properties of the resulting neutralized polymer blend composition (abbreviated below as "Ny-Ionomer 1").

The Ny-Ionomer 1 material was injection-molded as a two-piece golf ball cover material over a crosslinked butadiene rubber core (diameter, 39.3 mm; weight, 36.9 g; compressive strain, 3.25 mm), thereby producing a two-piece golf ball. Table 1 shows the results obtained from the evaluation of the resulting golf ball.

The above crosslinked butadiene rubber core was prepared by formulating the following ingredients in the indicated proportions.

| | |
|---|---|
| cis-1,4-Polybutadiene rubber | 100 parts by weight |
| Zinc diacrylate | 21 parts by weight |
| Zinc oxide | 5 parts by weight |
| Barium sulfate | 26 parts by weight |
| Dicumyl peroxide | 0.8 part by weight |

The golf ball produced using Ny-Ionomer 1, when compared with Control 1 (in which Polyamide-2 was used alone; i.e., a zinc ionomer was not included) and Control 2 (a melt blend of the same components as those in Ny-Ionomer 1), was found to exhibit a good durability and scuff resistance with no loss in rebound resilience.

Example 2

Aside from using ZnOMB as component A instead of the ZnO Powder used in Example 1, the same procedures were carried out as in Example 1 using the mixing proportions shown in Table 1, thereby giving Ny-Ionomer 2 and a two-piece golf ball obtained using Ny-Ionomer 2 as the cover material. Table 1 shows the physical properties of Ny-Ionomer 2 and the golf ball.

The resulting golf ball exhibited properties similar to those of the ball obtained in Example 1. When compared to Control 1 (in which Polyamide-2 was used alone; i.e., a zinc ionomer was not included) and Control 2 (a melt blend of the same components as those in Ny-Ionomer 1), the golf ball obtained in Example 2 had a good durability and scuff resistance with no loss in rebound resilience.

Example 3

Aside from using Polymer-4 (which corresponds to a combination of ZnO Powder and Polymer-3) as component D instead of the ZnO Powder used as component A and Polymer-3 used as component C in Example 1, the same procedures were carried out as in Example 1 using the mixing proportions shown in Table 1, thereby giving Ny-Ionomer 3 and a two-piece golf ball obtained using Ny-Ionomer 3 as the cover material. Table 1 shows the physical properties of Ny-Ionomer 3 and the golf ball. The golf ball obtained in Example 3, when compared to Control 1 (in which Polyamide-1 was used alone; i.e., a zinc ionomer was not included) and Control 2 (a melt blend of the same components as those in Ny-Ionomer 1), had a good durability and scuff resistance with no loss in rebound resilience.

Example 4

Aside from replacing a portion of the Polyamide-2 used as component B in Example 3 with Polyamide-1 (a homopolyamide), the same procedures were carried out as in Example 3 using the mixing proportions shown in Table 1, thereby giving Ny-Ionomer 4 and a two-piece golf ball obtained using Ny-Ionomer 4 as the cover material. Table 1 shows the physical properties of Ny-Ionomer 4 and the golf ball. The golf ball obtained in Example 4, when compared to Control 3 (a melt blend of the same components as those in Ny-Ionomer 4), had a good durability and scuff resistance with no loss in rebound resilience.

Control 1

In contrast with Examples 1, 2 and 3, a zinc ionomer was not included. Polyamide-2 and Polymer-1 (a polymer prepared from the component A material NaMB and the component C material Polymer-2) were melt-blended as component B in the proportions shown in Table 1 with the twin-screw extruder used in Example 1, thereby giving the melt-blended material Ny-Ionomer 5, and two-piece golf balls were produced in the same way as in Example 1. The physical properties of the balls are shown in Table 1. The melt-blended material Ny-Ionomer 5 obtained in Control 1 resulted in a pronounced decline in durability, because the polyamide material was not a formulation that adopted an interpenetrating polymer network (IPN) structure as the molecular structures of the materials in the manner of Examples 1 to 3, but instead had merely a salt-and-pepper structure owing to the simple melt-blending. Moreover, because a zinc ionomer was not included among the ingredients therein.

Control 2

Aside from replacing a portion of the Polymer-1 used as component B in above Control 1 with the zinc ionomer Polymer-4 as component D, the same procedures were carried out as in Control 1 using the mixing proportions shown in Table 1, thereby giving the melt blend material Ny-Ionomer 6 and two-piece golf balls. The physical properties of the balls are shown in Table 1. Compared with Control 1, the durability improved on account of the incorporation of the zinc ionomer. However, golf balls made with the melt-blended material Ny-Ionomer 6 still had an inferior durability compared with Examples 1 to 3 in which the polyamide materials had an IPN structure.

Control 3

In this control for Example 4, the melt-blended material Ny-Ionomer 7 and two-piece golf balls made with Ny-Ionomer 7 were obtained by using, as shown in Table 1, mixing proportions corresponding to the ingredients in Example 4 and carrying out the same procedures as in Control 1. The physical properties of the balls are shown in Table 1. Compared with Example 4, in which the polyamide material had an IPN structure, the golf ball made with Ny-Ionomer 7, which was merely a melt-blended material, had an inferior durability.

Reference Example

As a reference example, the ternary polyamide Polyamide-2 of component B was used alone as the cover material. Two-piece golf balls were manufactured using cores identical to those used in the above working examples of the invention and the controls. The balls were subjected to tests, the results of which are shown in Table 1. In the durability test, all four of the balls that were tested cracked on the initial first impact. Even in the initial velocity measurement test, all ten balls that were used cracked on the initial first impact. These results demonstrated that the ternary polyamide material Polyamide-2 has a poor durability.

Sakai Chemical Industry Co., Ltd. Average particle size, 0.8 μm; particle size distribution, 0.07 to 3.00 μm.

ZnO Powder

Zinc oxide (Nanofine-50) available from Sakai Chemical Industry Co., Ltd. Average particle size, 20 nm; particle size distribution, 1 to 100 nm. Proportion having a particle size of 0.05 or smaller, about 60%.

Polyamide-1

Homopolyamide 12, available from Ube Industries, Ltd. as UBE Nylon 3014B.

Polyamide 2

Ternary polyamide 6/66/12, available from Ube Industries, Ltd. as UBE Nylon Terpalex.

Polymer-1

Sodium ionomer of ethylene-methacrylic acid copolymer, available from DuPont as Surlyn 8920. MFR, 1.0 g/10 min.

Polymer-2

Ethylene-methacrylic acid copolymer, available from DuPont as Nucrel 960. MFR, 60 g/10 min.

TABLE 1

| Items Sample's Names | Working Example | | | | Control | | | Reference Example |
|---|---|---|---|---|---|---|---|---|
| | 1 Ny-Ionomer 1 | 2 Ny-Ionomer 2 | 3 Ny-Ionomer 3 | 4 Ny-Ionomer 4 | 1 Ny-Ionomer 5 | 2 Ny-Ionomer 6 | 3 Ny-Ionomer 7 | |
| Component A | | | | | | | | |
| NaMB | 6.10 | 6.10 | 6.10 | 6.10 | — | — | — | — |
| ZnMB | — | 1.06 | — | — | — | — | — | — |
| ZnO Powder | 0.53 | — | — | — | — | — | — | — |
| Component B | | | | | | | | |
| Polyamide-1 | — | — | — | 5 | — | — | 5 | — |
| Polyamide-2 | 30 | 30 | 30 | 25 | 30 | 30 | 25 | 100 |
| Polymer-1 | — | — | — | — | 70 | 55 | 55 | — |
| Component C | | | | | | | | |
| Polymer-2 | 55 | 55 | 55 | 55 | — | — | — | — |
| Polymer-3 | 15 | 15 | — | — | — | — | — | — |
| Component D | | | | | | | | |
| Polymer-4 | — | — | 15 | 15 | — | 15 | 15 | — |
| Specific Gravity | 0.994 | 0.993 | 0.993 | 0.992 | 0.992 | 0.993 | 0.992 | 1.107 |
| MFR (g/10 min, 220° C., 21.18N) | 1.3 | 1.4 | 1.3 | 1.4 | 1.7 | 1.6 | 1.7 | 5.3 |
| Hardness (Shore D) | 62 | 61 | 62 | 62 | 64 | 61 | 60 | 75 |
| Ultimate tensile strength (MPa) | 29.8 | 28.6 | 28.9 | 28.1 | 33.4 | 30.7 | 30.1 | 71.2 |
| Ultimate tensile elongation (%) | 301 | 308 | 302 | 311 | 284 | 301 | 312 | 335 |
| Golf Ball Diameter (mm) | 42.71 | 42.70 | 42.71 | 42.72 | 42.70 | 42.71 | 42.70 | 42.70 |
| Golf Ball Weight (g) | 45.56 | 45.54 | 45.57 | 45.56 | 45.55 | 45.56 | 45.54 | 45.60 |
| Deflection (mm) | 2.69 | 2.70 | 2.70 | 2.71 | 2.60 | 2.69 | 2.69 | 2.11 |
| Durability (Shot number) | 101 | 109 | 94 | 98 | 27 | 76 | 78 | 1 |
| Initial Velocity (m/sec) | 76.43 | 76.41 | 76.42 | 76.40 | 76.46 | 76.43 | 76.39 | na[1] |
| Average COR ($1^{st}$ to $10^{th}$ shot) | 0.772 | 0.771 | 0.770 | 0.770 | 0.785 | 0.770 | 0.770 | na[1] |
| Scuff Resistance[2] | 2 | 2 | 2 | 2 | 2 | 2 | 2 | 1 |

[1] Not applicable
[2] On a scale of 1 (best) to 6 (poorest)

The ingredients appearing in the table are explained below.

NaMB

Sodium carbonate/ethylene-methacrylic acid-isobutyl acrylate terpolymer=50/50 wt %.

ZnMB

Zinc oxide/ethylene-methacrylic acid-isobutyl acrylate terpolymer=50/50 wt %. Zinc oxide (Grade 1) available from Polymer-3

The base polymer Surlyn 9945, an ethylene-methacrylic acid copolymer available from DuPont. MFR, 300 g/10 min.

Polymer-4

Zinc ionomer of ethylene-methacrylic acid copolymer, available from DuPont as Surlyn 9945. MFR, 5.0 g/10 min.

The tests appearing in the table are explained below.

MFR (q/10 min)

The melt flow rate was measured in accordance with JIS-K7210 at a test temperature of 220° C. and a test load of 21.18 N (2.16 kgf).

Shore D Hardness

The Shore D hardness was measured in accordance with ASTM D-2240.

Tensile Elongation (%), Tensile Strength (MPa)

Measured in accordance with JIS-K7161.

Deflection (mm)

The golf ball was placed on a steel plate, and the deflection (mm) by the ball when compressed under a final load of 1,275 N (130 kgf) from an initial load of 98 N (10 kgf) was measured. This test was carried out at 23±1° C.

Shot Number (Durability)

The durability of the golf ball was evaluated using an ADC Ball COR Durability Tester manufactured by Automated Design Corporation (U.S.). A ball was fired using an air pressure and made to repeatedly strike two steel plates arranged in parallel. The average number of shots required for the ball to crack was treated as its durability. These average values were obtained by furnishing four balls of the same type for testing, repeatedly firing each ball until it cracked, and averaging the number of shots required for the four balls to crack. The type of tester used was a horizontal COR durability tester, and the incident velocity of the balls on the steel plates was 43 m/s.

Initial Velocity (m/sec)

The initial velocity was measured using an initial velocity measuring apparatus of the same type as the USGA drum rotation-type initial velocity instrument approved by the R&A. The ball was temperature-conditioned for 3 hours at 23±1° C., then tested at the same temperature by being hit with a 250 pound (113.4 kg) head (striking mass) at an impact velocity of 143.8 ft/s (43.83 m/s). Ten balls were each hit twice. The time taken to traverse a distance of 6.28 ft (1.91 m) was measured and used to compute the initial velocity of the ball. This cycle was carried out over a period of about 15 minutes.

Coefficient of Restitution (COR)

The ball was fired from an air cannon against a steel plate at a velocity of 43 m/s, and the rebound velocity was measured. The coefficient of restitution (COR) is the ratio of the rebound velocity to the initial velocity of the ball. Each value shown in the table is the average of ten measurements.

Scuff Resistance

The golf balls were held at a temperature of 23±1° C. and hit at a head speed of 33 m/s using a pitching wedge mounted on a swing robot machine, after which damage from the impact was visually rated according to the following scale.

| | |
|---|---|
| Best: | 1 point |
| Better: | 2 points |
| Good (ordinary): | 3 points |
| Poor: | 4 points |
| Poorer: | 5 points |
| Poorest: | 6 points |

The invention claimed is:

1. A golf ball comprising a part molded from a golf ball material comprising, in admixture:
   (A) an oxygen-containing inorganic metal compound;
   (B) one or more polymers selected from the group consisting of multi-component polyamides; and
   (C) one or more acid-containing polymers selected from the group consisting of olefin-unsaturated carboxylic acid copolymers, olefin-unsaturated carboxylic acid-unsaturated carboxylic acid ester terpolymers, unsaturated carboxylic anhydride-containing polymers, unsaturated dicarboxylic acid-containing polymers and unsaturated dicarboxylic acid half ester-containing polymers, having an acid content of from 0.5 to 30 wt %,
   wherein component (B) includes at least a ternary polyamide selected from the group consisting of polyamide 6/66/12, polyamide 6/66/69, polyamide 6/66/612 and polyamide 6/612/12.

2. The golf ball of claim 1, wherein component A is selected from (A1) ultrafine particles of an oxygen-containing inorganic metal compound which includes at least a zinc cationic species and/or (A2) an oxygen-containing inorganic metal compound in masterbatched form which includes at least a zinc cationic species.

3. The golf ball of claim 1, wherein an ionomer blend composition comprising the oxygen-containing inorganic metal compound (A) in admixture with an acid-containing polymer blend composition of components B and C includes at least a zinc cationic species.

4. The golf ball of claim 1, wherein component B comprises one or more selected from the group consisting of ternary polyamides in combination with a copolyamide and/or homopolyamide other than said ternary polyamides.

5. The golf ball of claim 1, wherein component B comprises one or more selected from the group consisting of ternary polyamides in combination with a thermoplastic polymer other than said ternary polyamides.

6. The golf ball of claim 1, wherein the amount of component B, as a proportion of an acid-containing polymer blend composition of components B and C overall, is at least about 1 wt % but not more than about 50 wt %.

7. The golf ball of claim 1, wherein the amount of the ternary polyamide in component B, as a proportion of an acid-containing polymer blend composition of components B and C overall, is at least about 50 wt %.

8. The golf ball of claim 1, wherein the ternary polyamide in component B has a melting point in a range of from about 80° C. to about 250° C.

9. The golf ball of claim 1, wherein the amount of component A admixed with an acid-containing polymer blend composition of components B and C is selected according to the degree of neutralization of the acid groups in the acid-containing polymer blend composition and is such that the degree of neutralization by at least a zinc cationic species is in a range of from at least 0.1 mol % to 100 mol % of all the carboxylic acids present in the acid-containing polymer blend composition.

10. The golf ball of claim 1, wherein the oxygen-containing inorganic metal compound is in the form of ultrafine particles (component A1 or A3) which have an average particle size of from 0.005 to 0.1 μm and a particle size distribution of from 0.001 to 1.0 μm.

11. The golf ball of claim 10, wherein the oxygen-containing metal compound in the form of ultrafine particles is one or more compounds selected from the group consisting of lithium carbonate, sodium carbonate, potassium carbonate, magnesium carbonate, calcium carbonate, zinc carbonate, basic zinc carbonate, magnesium oxide, zinc oxide and calcium oxide (component A1) or one or more compounds selected from the group consisting of lithium carbonate, sodium carbonate, potassium carbonate, magnesium carbonate, calcium carbonate, magnesium oxide and calcium oxide (component A3).

12. The golf ball of claim 1, wherein component A is an oxygen-containing inorganic metal compound (component A2 or A4) in masterbatched form, which oxygen-containing inorganic metal compound has an average particle size of from 0.005 to 50 μm and a particle size distribution of from 0.001 to 300 μm.

13. The golf ball of claim 12, wherein the oxygen-containing inorganic metal compound is one or more compounds selected from the group consisting of lithium carbonate, sodium carbonate, potassium carbonate, magnesium carbonate, zinc carbonate, basic zinc carbonate, magnesium hydroxide, magnesium oxide, calcium hydroxide, calcium oxide and zinc oxide (component A2) or one or more compounds selected from the group consisting of lithium carbonate, sodium carbonate, potassium carbonate, magnesium carbonate, magnesium hydroxide, magnesium oxide, calcium hydroxide and calcium oxide (component A4).

14. The golf ball of claim 12, wherein the oxygen-containing inorganic metal compound in masterbatched form is obtained by blending at least 20 wt % and up to 80 wt % of the oxygen-containing inorganic metal compound with a base polymer material having a melt flow rate (MFR) of at least 10 g/10 min.

15. A golf ball of claim 1, wherein the part is a cover in a solid two-piece golf ball comprising a core and a cover encasing the core, or a cover or an intermediate layer in a solid multi-piece golf ball comprising a core of at least one layer, at least one intermediate layer encasing the core, and a cover of at least one layer encasing the intermediate layer.

16. A golf ball material comprising, in admixture:
(A) ultrafine particles of an oxygen-containing inorganic metal compound which does not include a zinc cationic species (A3) and/or an oxygen-containing inorganic metal compound in masterbatched form which does not include a zinc cationic species (A4);
(B) one or more polymers selected from the group consisting of multi-component polyamides;
(C) one or more acid-containing polymers selected from the group consisting of olefin-unsaturated carboxylic acid copolymers, olefin-unsaturated carboxylic acid-unsaturated carboxylic acid ester terpolymers, unsaturated carboxylic anhydride-containing polymers, unsaturated dicarboxylic acid-containing polymers and unsaturated dicarboxylic acid half ester-containing polymers, having an acid content of from 0.5 to 30 wt %; and
(D) an ionomer which includes at least a zinc cationic species,
wherein component (B) includes at least a ternary polyamide selected from the group consisting of polyamide 6/66/12, polyamide 6/66/69, polyamide 6/66/610, polyamide 6/66/612 and polyamide 6/612/12.

17. The golf ball material of claim 16, wherein component D is a zinc ionomer in which acid groups on one or more polymers selected from the group consisting of olefin-unsaturated carboxylic acid copolymers, olefin-unsaturated carboxylic acid-unsaturated carboxylic acid ester terpolymers, unsaturated carboxylic anhydride-containing polymers, unsaturated dicarboxylic acid-containing polymers and unsaturated dicarboxylic acid half ester-containing polymers are partially neutralized.

18. The golf ball material of claim 16, wherein the amount of component B, as a proportion of an acid-containing polymer blend composition of components B, C and D overall, is at least about 1 wt % but not more than about 50 wt %.

19. The golf ball material of claim 16, wherein the amount of a ternary polyamide in component B, as a proportion of an acid-containing polymer blend composition of components B, C and D overall, is at least about 50 wt %.

20. A method for preparing a golf ball comprising a part molded from a golf ball material which is composed of, in admixture:
(A) an oxygen-containing inorganic metal compound;
(B) one or more polymers selected from the group consisting of multi-component polyamides; and
(C) one or more acid-containing polymers selected from the group consisting of olefin-unsaturated carboxylic acid copolymers, olefin-unsaturated carboxylic acid-unsaturated carboxylic acid ester terpolymers, unsaturated carboxylic anhydride-containing polymers, unsaturated dicarboxylic acid-containing polymers and unsaturated dicarboxylic acid half ester-containing polymers, having an acid content of from 0.5 to 30 wt %,
the method being comprised of blending together components B and C to form an acid-containing polymer blend composition, then mixing component A into the acid-containing polymer blend composition so as to carry out a reaction which neutralizes the acids in the acid-containing polymer blend composition, and molding the resulting mixture to form the part,
wherein component (B) includes at least a ternary polyamide selected from the group consisting of polyamide 6/66/12, polyamide 6/66/69, polyamide 6/66/612 and polyamide 6/612/12.

21. The method of claim 20, wherein component A is selected from (A1) ultrafine particles of an oxygen-containing inorganic metal compound which includes at least a zinc cationic species and/or (A2) an oxygen-containing inorganic metal compound in masterbatched form which includes at least a zinc cationic species.

22. A method for preparing a golf ball material which is composed of, in admixture:
(A) ultrafine particles of an oxygen-containing inorganic metal compound which does not include a zinc cationic species (A3) and/or an oxygen-containing inorganic metal compound in masterbatched form which does not include a zinc cationic species (A4);
(B) one or more polymers selected from the group consisting of multi-component polyamides;
(C) one or more acid-containing polymers selected from the group consisting of olefin-unsaturated carboxylic acid copolymers, olefin-unsaturated carboxylic acid-unsaturated carboxylic acid ester terpolymers, unsaturated carboxylic anhydride-containing polymers, unsaturated dicarboxylic acid-containing polymers and unsaturated dicarboxylic acid half ester-containing polymers, having an acid content of from 0.5 to 30 wt %; and
(D) an ionomer which includes at least a zinc cationic species,
the method being comprised of blending together components B, C and D to form an acid-containing polymer blend composition, then mixing (A3) ultrafine particles of an oxygen-containing inorganic metal compound which does not include a zinc cationic species and/or (A4) an oxygen-containing inorganic metal compound which does not include a zinc cationic species into the acid-containing polymer blend composition so as to carry out a reaction which neutralizes the acid in the acid-containing polymer blend composition,
wherein component (B) includes at least a ternary polyamide selected from the group consisting of polyamide 6/66/12, polyamide 6/66/69, polyamide 6/66/610, polyamide 6/66/612 and polyamide 6/612/12.

23. The method of claim 22, wherein the acid-neutralizing reaction on the acid-containing polymer blend composition which includes ultrafine particles of an oxygen-containing inorganic metal compound (A1, A3) and/or an oxygen-containing inorganic metal compound in masterbatched form (A2, A4) is carried out using a twin-screw extruder which (i) has a vent port and a vacuum line connected thereto, (ii) is equipped with a device for the dropwise addition or pressurized injection of a liquid, and (iii) has disposed therein a screw segment with a kneading disc zone.

* * * * *